May 6, 1924.
L. W. DILWEG
1,492,838
DEVICE FOR TRANSMITTING COMPRESSED AIR TO AUTOMOBILE TIRES
Filed Nov. 26, 1917
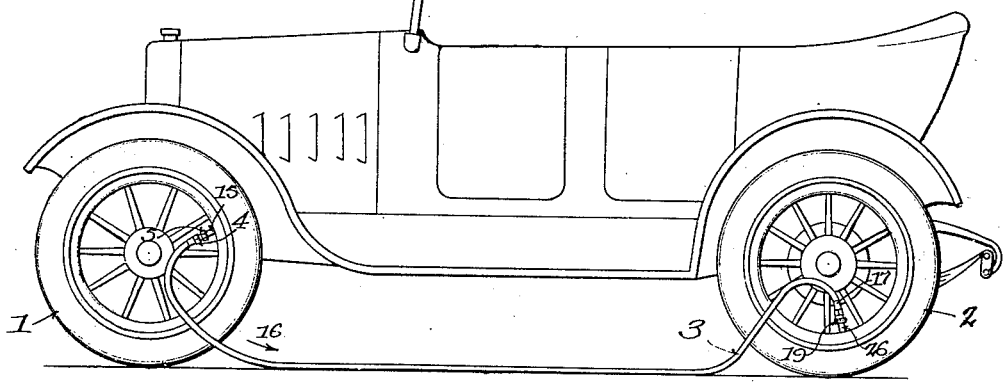
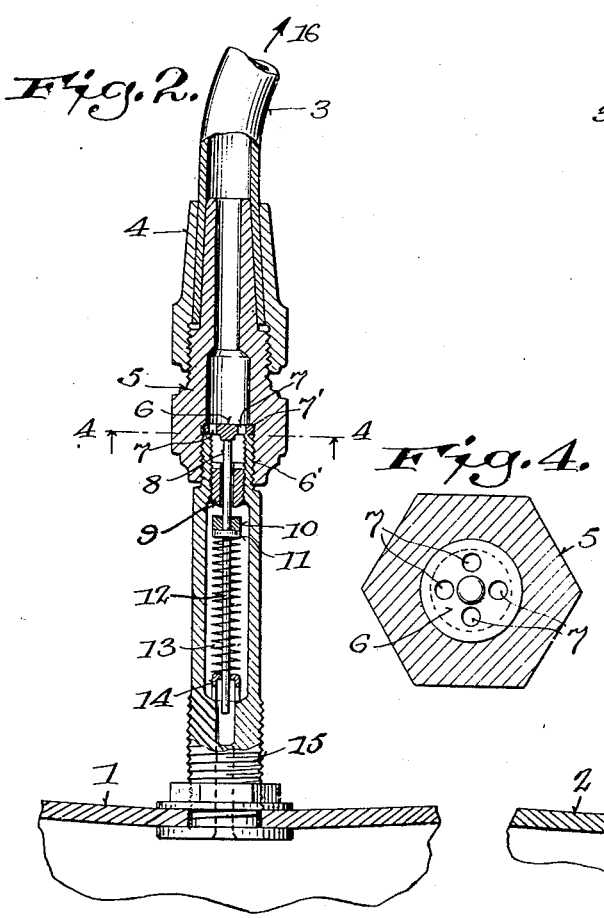
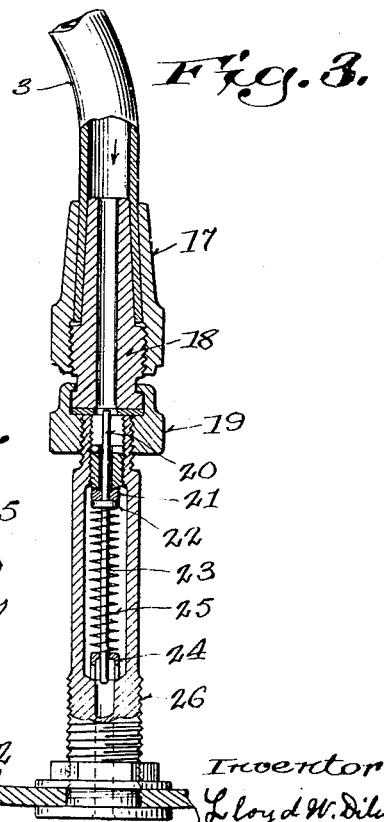

Patented May 6, 1924.

1,492,838

UNITED STATES PATENT OFFICE.

LLOYD W. DILWEG, OF MILWAUKEE, WISCONSIN.

DEVICE FOR TRANSMITTING COMPRESSED AIR TO AUTOMOBILE TIRES.

Application filed November 26, 1917. Serial No. 203,927.

*To all whom it may concern:*

Be it known that I, LLOYD W. DILWEG, a citizen of the United States, residing at Milwaukee, county of Milwaukee, and State of Wisconsin, have invented new and useful Improvements in Devices for Transmitting Compressed Air to Automobile Tires, of which the following is a specification.

One of the primary objects of my present invention is to provide a device for conveying compressed air from one pneumatic tire to another.

I have found by experience that it sometimes occurs that the compressed air escapes from one or more of the inflated tires of an automobile wheel, and such tire becomes deflated, while some of the other tires remain inflated, and sometimes, owing to the expansion of air therein, such tires have an excess of pressure which should be permitted to escape. The object of my present invention is therefore to provide a simple and efficient means of transmitting compressed air from one pneumatic tire to another, whereby I am enabled to inflate a deflated tire without using a pump when on the road or in the country where compressed air cannot be conveniently supplied, while compressed air may by my device be transmitted from any one or more wheels to any one or more other wheels, regardless of the location of such other wheels, or whether such wheels form part of the same vehicle or not. I have for convenience of illustration shown one of the front wheels of an automobile connected with one of the rear wheels of such vehicle.

My invention is further explained by reference to the accompanying drawing, in which—

Figure 1 represents a side view of an automobile, provided with my device for transmitting compressed air from one pneumatic tire to another.

Figure 2 is a side view, mostly in vertical section of a simple device for connecting a flexible tube with one of the wheels having a surplus of compressed air.

Figure 3 is a similar view to that shown in Figure 2, showing the device located at the opposite end of said flexible tube with a pneumatic tire which has become deflated, and Figure 4 is a transverse section of the device drawn on line 4—4 of Figure 2.

Like parts are identified by the same reference numerals thruout the several views.

1 represents one of the front wheels of an automobile having a pneumatic tire. 2 is one of the rear wheels of such automobile. 3 is a flexible tube thru which an excess of air is transmitted from the front to the rear wheel, or any other wheels of a vehicle, as circumstances may require. The tube 3 is preferably made of rubber, and the same is connected with wheel 1 thru the sleeves 4 and 5, disk 6, said disk being provided with apertures 7, rod 8, guide 9, valve 10, disk 11, rod 12, spring 13, guiding bracket 14 and connecting sleeve 15, whereby air is led, as indicated by the arrow 16, to the opposite end of said tube 3 when it passes into the deflated tire of wheel 2, thru the sleeves 17 and 18 and coupling 19, thence around the valve stem 20, when it passes down past the other valve 21. The valve 21 is supported on the disk 22, and said disk 22 is supported by the rod 23. Interposed between the disk 22 and the bracket 24 is a spiral spring 25, which spring is adapted by its recoil to hold said valve 21, when not forced open by the incoming air, to its seat. The coupling 19 is connected with the pneumatic tire of the wheel 2 thru the sleeve 26, whereby when said wheels 1 and 2 are connected together, as shown in Figure 1, compressed air may be readily led from the pneumatic tire on said wheel 1 to the pneumatic tire on said wheel 2, or from any pneumatic tire having a surplus of compressed air to any tire having a less supply of compressed air.

It will be understood that as the sleeve 5 is turned down on the threaded end 6' of the sleeve 15 the shoulder 7' is brought in contact with the upper surface of the disk 6, whereby said disk and the rod 8 are moved downwardly, and whereby the valve 10 is opened.

My invention will prove to be very useful in such emergencies as may arise, wherein the motorist discovers that he has a deflated tire and is without a reserve air supply container or a pump which may be used to restore the deflated tire. Such emergencies usually occur when the motorist is out on the road and not within access to a compressed air supply, and often imposes upon the motorist the duty of a disagreeable trip in quest of relief. My invention is designed to overcome the difficulties and vexations of the situation thus created, and enable the motorist to restore the deflated tire by drawing from other inflated tires a portion of the compressed air therein, and transferring it to the deflated tire. By means of usual pressure gauges, it may be determined when the reduction of pressure in the full tire has reached the point of safety. If necessary, the other tires in the equipment may be drawn on for a contribution of compressed air, as before, so that the pressure may be equalized in the set of tires. By means of the emergency device which I have devised, a disabled motorist will be enabled to reach a station where permanent relief may be secured, without suffering the delay, inconvenience and damage which otherwise would be encountered.

Having thus described my invention what I claim as new and desire to secure by Letters Patent, is:—

1. The process herein described for transmitting compressed air from an inflated automobile tire to a relatively deflated tire, consisting in connecting such tires together with an air tight duct, and permitting the highly compressed air to pass through such duct from the inflated to the other tire.

2. The process herein described for transmitting compressed air from an inflated automobile tire to a relatively deflated tire, both connected with the same automobile, consisting in connecting such tires together with an air tight duct, and permitting the highly compressed air to pass through such duct from the inflated to the other tire.

3. In an automobile, means for transmitting compressed air from an inflated tire to one which is relatively deflated, the said means comprising a tube for connecting the tires, each of the latter being provided with a normally closed inlet valve and a stem for operating the same against the confined air pressure, the said tube being provided at one end with means for engaging the stem of the inflated tire to open the valve therein to permit the flow of air from the inflated to the deflated tire.

4. Means for inflating pneumatic tires, wherein one pneumatic tire contains greater air pressure than another pneumatic tire, and wherein air from the first named tire is transferred to the second named tire, a flexible conduit, a coupling at each end of the conduit for attachment to the tire valves, said couplings permitting deflation and inflation of the tires for equalizing air pressure in the tires.

5. Means to utilize the compressed air contained in a pneumatic tire, comprising a flexible conduit, and a coupling at each end of the conduit, one of said couplings being designed for attachment to the valve of said tire, and constructed to control the passage of air through the conduit.

6. A device for equalizing the pressure in tires, comprising a conduit having terminal members formed to be placed in connecting engagement with the valve nipples of two automobile tires, one of said terminal members being provided with a valve unseating device for unseating the valve of one of said tires to permit air pressure to flow from that tire through the conduit and into the other tire.

7. That method of equalizing the pressure in pneumatic tires which consists in placing the interiors of the tires in communication with each other through a conduit.

In testimony whereof I affix my signature in the presence of two witnesses.

LLOYD W. DILWEG.

Witnesses:
JAS. B. ERWIN,
ALICE J. MCKERIHAN.